United States Patent
Kim et al.

(10) Patent No.: US 8,654,063 B2
(45) Date of Patent: Feb. 18, 2014

(54) PHOTO-SENSING TYPE TOUCH PANEL EMBEDDED LIQUID CRYSTAL DISPLAY DEVICE AND METHOD FOR DRIVING THE SAME

(75) Inventors: Cheol-Se Kim, Daegu (KR); Ji-Hyun Jung, Gumi-si (KR); Min-Jae Lee, Daegu (KR); Hoon-Bae Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 658 days.

(21) Appl. No.: 12/648,205

(22) Filed: Dec. 28, 2009

(65) Prior Publication Data

US 2011/0063243 A1    Mar. 17, 2011

(30) Foreign Application Priority Data

Sep. 15, 2009   (KR) .................. 10-2009-0087245

(51) Int. Cl.
*G09G 3/36* (2006.01)
(52) U.S. Cl.
USPC .......................................... 345/102
(58) Field of Classification Search
USPC .......................................... 345/102
See application file for complete search history.

(56) References Cited

U.S. PATENT DOCUMENTS

| | | | |
|---|---|---|---|
| 2006/0103637 A1 | 5/2006 | Yamaguchi et al. | |
| 2006/0214892 A1 | 9/2006 | Harada et al. | |
| 2008/0192237 A1 | 8/2008 | Yamamoto | |
| 2008/0211787 A1 | 9/2008 | Nakao et al. | |
| 2008/0231564 A1* | 9/2008 | Harada et al. | 345/81 |
| 2008/0303807 A1* | 12/2008 | Nozawa | 345/207 |
| 2008/0309633 A1* | 12/2008 | Hotelling et al. | 345/173 |
| 2009/0161051 A1 | 6/2009 | Fukunaga et al. | |
| 2009/0225058 A1 | 9/2009 | Tateuchi et al. | |

FOREIGN PATENT DOCUMENTS

| | | |
|---|---|---|
| EP | 2 151 740 | 2/2010 |
| JP | 2006-276223 A | 10/2006 |
| JP | 2007-127705 A | 5/2007 |
| JP | 2009-128686 A | 6/2009 |

* cited by examiner

*Primary Examiner* — Jonathan Boyd
(74) *Attorney, Agent, or Firm* — Birch, Stewart, Kolasch & Birch, LLP

(57) ABSTRACT

A photo-sensing type touch panel embedded liquid crystal display device and a method for driving same are disclosed, where the device includes a liquid crystal panel includes a touch sensor provided in each of n pixels, where n is a Natural Number; a ROIC readout part which receives a readout voltage value from readout lines provided in the touch panel embedded liquid crystal panel; an ADC conversion part which converts an analog voltage value transmitted to the ROIC readout part into a digital value; a calculation part which calculates a calculated value by subtracting a corresponding value detected from the ADC conversion part when no-backlight is applied from a value detected from the ADC conversion part when a backlight is applied; and a position detection part for detecting a touch point on the photo-sensing type touch panel if the calculated value from the calculation part is beyond a predetermined value.

5 Claims, 17 Drawing Sheets

PHOTO-SENSING TYPE TOUCH PANEL EMBEDDED LIQUID CRYSTAL DISPLAY DEVICE AND METHOD FOR DRIVING THE SAME

CROSS REFERENCE TO RELATED APPLICATION

This application claims the benefit of the Patent Korean Application No. 10-2009-0087245, filed on Sep. 15, 2009, which is hereby incorporated by reference as if fully set forth herein.

BACKGROUND OF THE DISCLOSURE

1. Field of the Disclosure

The present invention relates to a liquid crystal display (LCD) device, more particularly, to a photo-sensing type touch panel embedded liquid crystal display device that is able to sense touching stably, and a method for driving the same.

2. Discussion of the Related Art

Recently, as information age really starts, display technology for presenting electric information signal visibly has been developed rapidly and various thinner and lighter flat display devices having excellent power consumption efficiency have been developed correspondingly to replace the cathode ray tube (CRT) devices.

Such a flat display devices may include a liquid crystal display (LCD), plasma display panel (PDP), field emission display (FED) and electro-luminescent display device (ELD) device and the like.

Above devices include a flat display panel capable of presenting images as an essential element and such a flat display panel has a configuration in that a pair of transparent insulation substrate having a luminescent or planarizing material provided there between.

The LCD device among the devices can control light permittivity by using an electric field to display images. For that, the LCD device includes a display panel having a liquid crystal, a backlight unit emitting a light to the display panel and a driving circuit for driving the backlight unit and a liquid crystal cell.

The display panel has plural unit pixel regions defined by plural gate lines and data lines that crosses. Here, a thin film transistor array substrate and a color filter array substrate face each other, a space is provided between the two substrates to form a uniform cell gap, and a liquid crystal filled in the cell gap may be provided in each of the pixel regions.

The thin film transistor array substrate includes gate/data lines, a thin film transistor formed at each cross portion between the gate and data lines as a switching device, a pixel electrode formed of liquid crystal pixel units to be connected to the thin film transistor, and an alignment layer coated on the above elements. The gate and data lines receive signals from the driving circuits via pad parts for them, respectively.

Here, the thin film transistor responds to a scan signal supplied to the gate line and the gate line supplies a pixel voltage signal supplied to the data line to the pixel electrode.

The color filter array substrate includes color filters formed by the liquid crystal cell unit, a black matrix for identifying the color filters and for reflecting an external light, a common electrode for supplying a reference voltage to the liquid crystal cells commonly, and an alignment layer coated on the above elements.

The thin film transistor substrate and the color filter array substrate fabricated independently are aligned and then they are attached to each other. After that, liquid crystal is injected and sealed in a gap thereof.

Here, the liquid crystal display device is a passive light emitting device that may control brightness of a screen by using a light emitted from the backlight unit arranged in a backside of the liquid crystal panel.

Techniques for attaching a touch screen panel to such a liquid crystal display device have been suggested recently. The touch screen panel is a user interface typically attached to a display device to sense a corresponding touch point by changing an electrical characteristic at the touch point touched by an opaque material such as a user's finger or a touch pen. When the user's finger or the touch pen touches a screen thereof, the touch screen panel attached liquid crystal display device can detect corresponding touch point information to present various applications based on detected information.

However, such a liquid crystal display device would cause several disadvantages, such as a cost increase because of the touch screen panel, a yield decrease because of additional process to attach the touch screen panel to the liquid crystal panel, and brightness deterioration/thickness increase of the liquid crystal panel.

Thus, recently a photo-sensor has been formed in the display panel to control the backlight unit based on brightness of external lights and the touch screen panel has been tried to be formed in the display panel in order not to be attached to an outside of the display panel, which would only lead to an increase in the volume of the display panel.

As follows, a conventional liquid crystal display (LCD) device will be described.

FIG. 1 is a sectional view schematically illustrating a LCD device including a conventional photo-type touch panel and FIG. 2 is a diagram illustrating a circuit of a conventional touch sensor.

As shown in FIG. 1, an LCD device having the conventional photo-sensing type touch panel embedded therein includes a liquid crystal panel 10 including a first substrate 1, a second substrate 2, a pixel TFT 3 and a sensor TFT 4 and a backlight unit 20 provided under the liquid crystal panel 10 to transmit a light to the liquid crystal panel 10.

Here, to perform the photo-sensing, a light is emitted through the liquid crystal panel from the backlight unit 20 and the emitted light is reflected toward the liquid crystal panel, so that when a user's finger or a predetermined material 30 touches the liquid crystal panel, such is sensed by the sensor TFT 4.

In reference to FIGS. 1 and 2, such a conventional photo-sensing type touch panel embedded LCD device converts a digital video data into an analog data voltage with respect to a Gamma-reference voltage, and it supplies the converted voltage to data lines DL and a scan pulse to gate lines GL simultaneously, such that a data voltage is charged in a liquid crystal cell C1c. For that, a gate electrode of a pixel transistor Tpixel is connected to GL, a source electrode is connected to DL, and a drain electrode of the pixel transistor Tpixel is connected to a pixel electrode of C1c and to an electrode of capacitor Cst1. A common voltage Vcom is supplied to a common electrode of the liquid crystal cell C1c. A storage capacitor Cst1 has the data voltage applied from DL charged therein when the pixel transistor Tpixel is turned on to maintain the voltage of the liquid crystal cell C1c. If the scan pulse is applied to the gate lines GL, the pixel transistor Tpixel is turned on and a channel is formed between the source electrode and the drain electrode to supply the voltage in DL to the pixel electrode of the liquid crystal cell C1c. Here, alignment of liquid crystal molecules of the liquid crystal cell C1c is changed by an electric field formed between the pixel electrode and the common electrode such that incident lights may be modified.

A touch sensor includes a sensing transistor Tsensor for generating a different light power according to the amount of lights incident from outside, a sensing capacitor Cst2 for storing electric charge of the electric currents i and a switching transistor Tsw for switching output of the electric charges stored in the sensing capacitor Cst2.

A bias voltage Vbias preset below a threshold voltage thereof is supplied to a gate electrode of the sensor transistor Tsensor. A gate electrode of the switching transistor Tsw is connected to a front gate line GLn−1 and a source electrode thereof is connected to the sensing capacitor Cst2 and a drain electrode thereof is connected to the readout line RO.

A driving voltage line having a driving voltage Vdrv applied there through is connected to a drain electrode of the sensor transistor Tsensor.

Such a touch sensor detects touch by using difference of photoelectric currents readout from the readout line RO in cases of a touch and a non-touch.

Operation of the touch sensor will be schematically described as follows.

The light reflected in case of a touch increases conductivity of the sensor transistor Tsensor enough to cause flow electric current toward the sensing capacitor Cst2 from the bias line Vbias, and a value beyond an initial voltage below the bias voltage Vbias is stored in the sensing capacitor Cst2 according to a touch condition.

Hence, if the switching transistor switch TFT connected to the readout line RO is turned on, the electric charge stored in the sensing capacitor Cst2 is output to the readout line RO to sense whether there is a touch and the sensing capacitor Cst2 is reset to a reference voltage value. After the reset, sensing for the touch may be performed and touch sensing is performed according to the identical process.

FIG. 3 is a diagram illustrating sensing degrees in comparison to a reference value according to the amount of external lights in cases there is a partial touch.

As shown in FIG. 3, as a point of a surface of the liquid crystal panel 10 is touched, a sensing degree of the touch point T is differentiated according to the light amount strength of external lights.

To sense touching, a predetermined reference value Ref is preset and change of photoelectric current strength of the backlight reflected light read at the touch point may be detected.

For example, if a point is touched in case of a strong external light, the light amount at the touch point is small in comparison to the reference value. As the difference between the light amounts at the touched point and the non-touched area is relatively large with respect to the reference value Ref, the touch detection may be performed smoothly based on the light amount difference.

In case of a middle external light, the light difference between the touched point and the other non-touched area is substantially not much larger and this light difference is not much larger with respect to the reference value ref. As a result, it is difficult to detect the touching because of the little difference.

In case of a weak external light, the light amount at the non-touched area is almost identical to the reference value Ref. In this case, the touched point has a relatively large value of the light amount with respect to the reference value. However, there is little difference of the light amount between the touched point and the non-touched area, and thus, it is difficult to detect the touching also.

However, the above conventional touch panel in-cell type LCD device may have following disadvantages.

First, according to the conventional touch panel embedded LCD device, the external light as well as the light reflected from the backlight may be recognized. As a result, the sensor may fail to recognize the input signal precisely if the illumination intensity of the reflected light is similar to that of the external light.

Furthermore, as the output signal according to a touch is differentiated according to external environment, algorithm manufacturing for touch point recognition may be complicated only to cause malfunction of the product. That is, if the external light is higher than the reflected light, the touch signal is output with a voltage lower than voltages of the other area. If the external light is lower than the reflected light, the touch signal is output with a higher voltage. As a result, it is difficult to recognize an actual touch signal.

Still further, if the sensor transistor is degraded, the touch sensor might output a non-touch sensing signal even when the user's finger or the like touches the liquid crystal cell formed thereon, and vice versa. The touch panel in-cell type LCD device may sense the touch point only with the relative difference of photoelectric current flowing via the sensor transistors. In this case, if the sensor transistor is degraded, it is almost impossible to recognize the actual touch precisely. For example, in case external environment has a strong illuminance, a shadow caused by the external light with the user's finger not touching the liquid crystal panel may be recognized as a touch.

SUMMARY OF THE DISCLOSURE

Accordingly, the present invention is directed to photosensing type touch panel embedded liquid crystal display device and a method for driving the same.

An object of the present invention is to provide a photo-sensing type touch panel embedded liquid crystal display device that is able to sense touching stably regardless of external light intensity.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a photo-sensing type touch panel embedded liquid crystal display device includes a liquid crystal panel comprising a touch sensor provided in each of n (n=Natural Number) pixels; a ROIC read/write part for receiving a readout voltage value from readout lines provided in the touch panel embedded liquid crystal panel; a ACD conversion part for converting the analog voltage value transmitted to the ROIC readout part into a digital value; a calculation part for subtracting a corresponding value detected from the ADC conversion part when no-backlight is applied from a value detected from the ADC conversion part when a backlight is applied; and a position detection part for detecting a touch point if the value calculated from the calculation part is beyond a predetermined value.

The photo-sensing type touch panel embedded liquid crystal display device and the method for driving the same may have following effects.

First of all, according to the method for driving the photo-sensing type touch panel embedded liquid crystal display device, the difference between the voltage value of the readout lines detected in case of a touch when the backlight is not applied is subtracted from the voltage value when the backlight is applied. As a result, regardless of the intensity of the external light, sensing may be performed stably by the voltage difference beyond a predetermined value in case of a touch and a non-touch whether there is the touch or the non-touch.

Furthermore, the present invention may include the touch sensor embedded in the liquid crystal panel, together with a thin film transistor array. As a result, an in-cell type touch panel may be embodied and touch may be detectable based on the readout voltage of only a touch point except the other area when the backlight is applied and not applied. Even with degradation of the touch sensor caused by the long time operation, enough voltage difference in the touch point and non-touch area may be maintainable. Because of that, reliability of the liquid crystal panel capable of sensing touch may be improved.

Also, a liquid crystal display device includes at least one pixel circuit; a backlight unit which emits back light when turned on and does not emit the back light when turned off; and a pair of sensors corresponding to the at least one pixel circuit, a first of the pair of sensors detecting an amount of first light while the backlight unit is turned on to output a first voltage corresponding to the detected amount of the first light, and a second of the pair of sensors detecting an amount of second light while the backlight unit is turned off to output a second voltage corresponding to the detected amount of the second light.

Also, method of driving a liquid crystal display device having at least one pixel circuit, first and second sensors corresponding to the at least one pixel circuit, and a backlight unit which emits backlight when turned on and does not emit the backlight when turned off, includes providing a vertical synchronization signal having a predetermined fallen time period to the liquid crystal display device; and applying first and second control signals to first and second control lines of respective first and second sensors during the predetermined fallen time period, wherein the first control signal is applied for a predetermined period while the backlight is on, and the second control signal is applied subsequent to the predetermined time period while the backlight is off.

It is to be understood that both the foregoing general description and the following detailed description of the present invention are examples and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

As follows, a touch panel embedded liquid crystal display LCD device according to embodiments of the present invention and a method for driving the device will be described in reference to the accompanying drawings.

Figure 1:
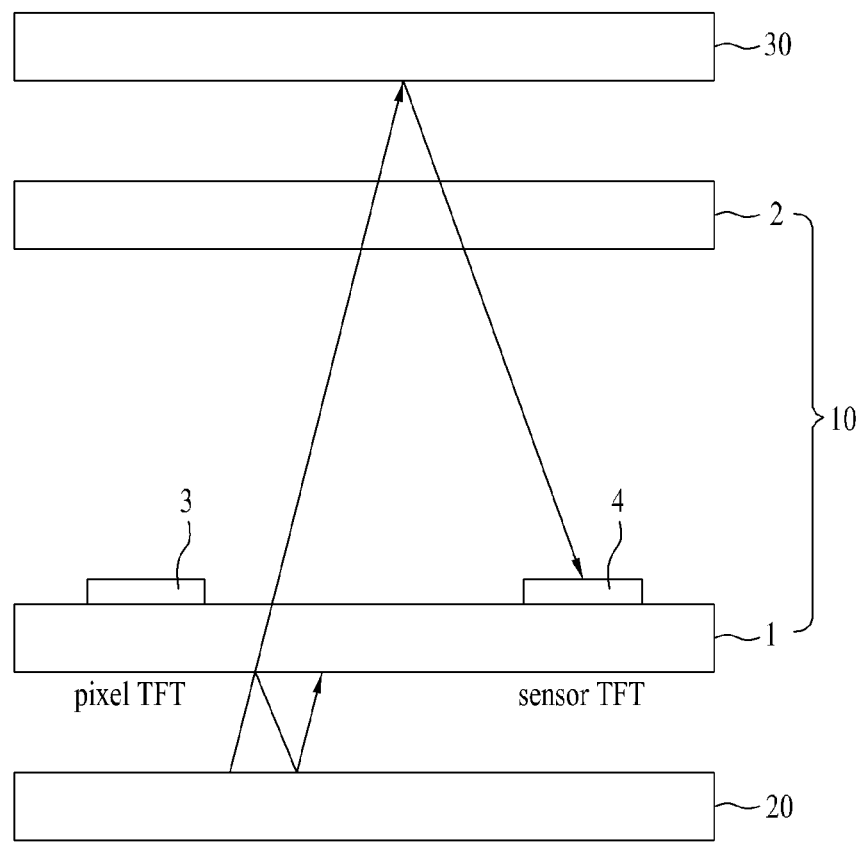
FIG. 1 is a sectional view schematically illustrating a liquid crystal display device including a conventional photo-type touch panel.
Figure 2:
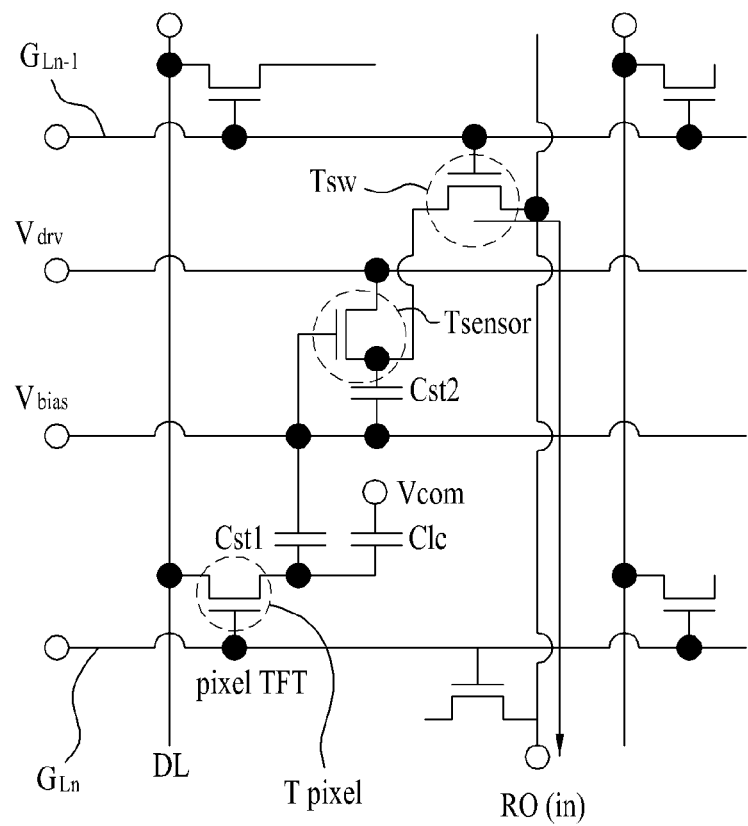
FIG. 2 is a circuit view of a conventional touch sensor.
Figure 3:
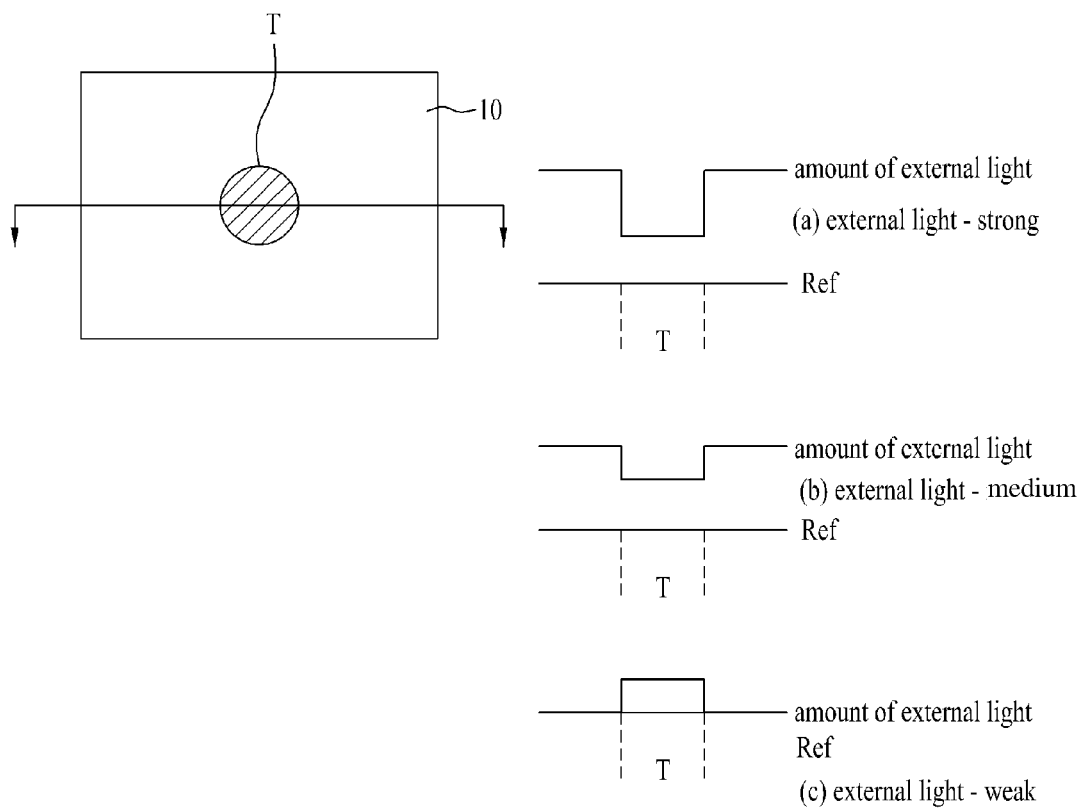
FIG. 3 is a diagram illustrating a sensing degree in comparison to a reference value according to an external light amount in case of a partial touch.
Figure 4:
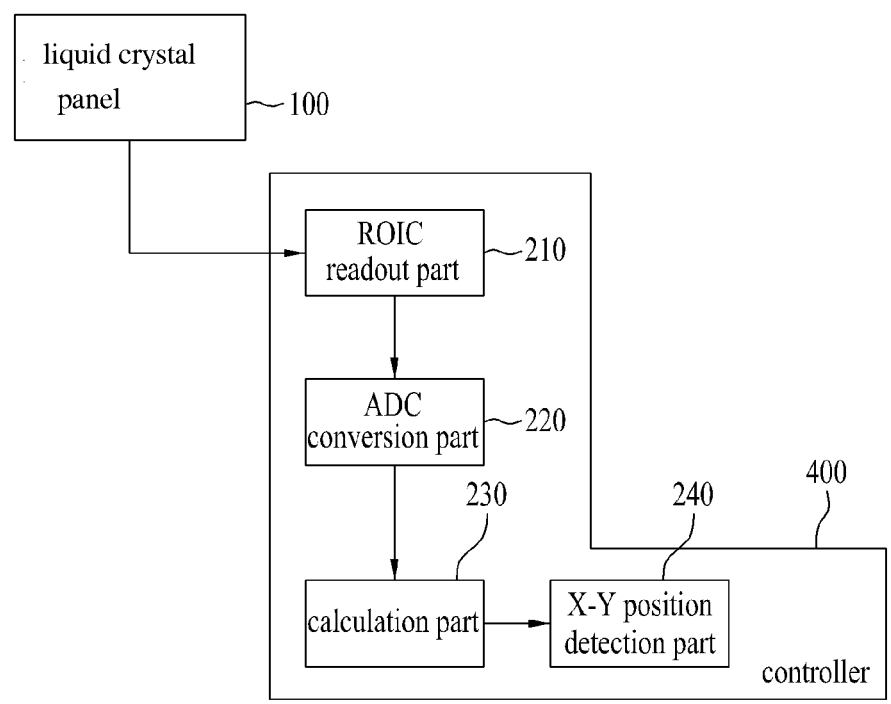
FIG. 4 is a block view illustrating a photo-sensing type touch panel embedded liquid crystal display device according to embodiments of the present invention.

FIG. 4 is a block view illustrating the photo-sensing type touch panel embedded LCD device according to embodiments of the present invention.

As shown in FIG. 4, the photo-sensing type touch panel embedded LCD device includes a liquid crystal panel 100, a readout integrated circuit (ROIC) readout part 210, an ADC conversion part 220, a calculation part 230, and an X-Y position detection part 240. The liquid crystal panel 100 is a touch panel embedded type and includes a photo-sensor, that is, a touch sensor provided in each of n (n=Natural Number) pixels. The ROIC readout part 210 receives a readout voltage from readout lines provided in the touch panel embedded liquid crystal panel 100. The ADC conversion part 220 coverts an analog value of the read/writing voltage transmitted from the ROIC readout part 210 into a digital value. The calculation part 230 calculates a corresponding value detected from the ADC conversion part 220 in case a backlight light is applied from the value detected from the ADC conversion part. The X-Y position detection part 240 detects a touch point from a corresponding point in a case when a value beyond a reference value is calculated from the calculation part 230.

Here, the ROIC readout part 210, ADC conversion part 220, calculation part 230 and X-Y position detection part 240 are provided in a controller 400, and the controller 400 is employed to drive the liquid crystal panel 100, rather than to sense touching. A liquid panel driving part of the controller 400 is omitted and not shown in the drawings.

A function of the calculation part 230 of the photo-sensing type touch panel embedded LCD device will be described in relation to external light luminance.

Figure 5:
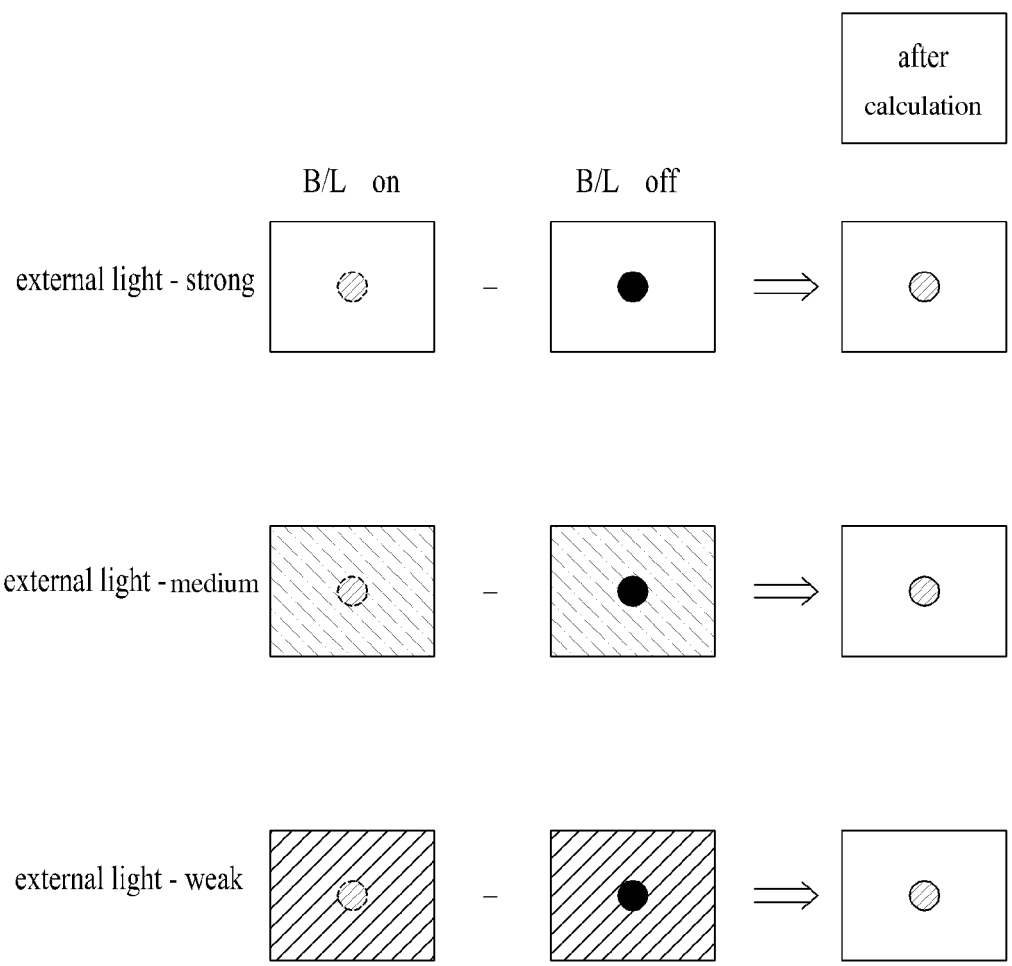
FIG. 5 is a diagram illustrating light amount calculation according to touch if a backlight is turned on and off according to external light intensity.

FIG. 5 is a diagram illustrating calculation of a light amount of a touch when a backlight is turned on and off according to an external light luminance.

FIG. 5 shows that the light amount of a state when the backlight turned on is subtracted from the light amount of a state when the backlight turned off. There is no difference of external light in the other area except a touch point when the backlight is turned on and off. However there is difference of external light in the touch point because of a backlight reflection light. In embodiments of the invention, the light amount of a state when the backlight turned on may be referred to as a first light, and the light amount of a state when the backlight turned off may be referred to as a second light. In embodiments of the invention, the first light may include the external light, the backlight, and or any reflected light from a touch, and the second light may include the external light, and/or any reflected light from the touch, but not the backlight. In embodiments of the invention, external light may be also referred to as ambient light.

Comparing the light amount of the state when the backlight is on to the light amount of the state when the backlight is off, the difference is generated only in the touch point, regardless of the luminance of the external light. The photo-sensing type touch panel embedded LCD device detects the touch by using the difference.

Figure 6:
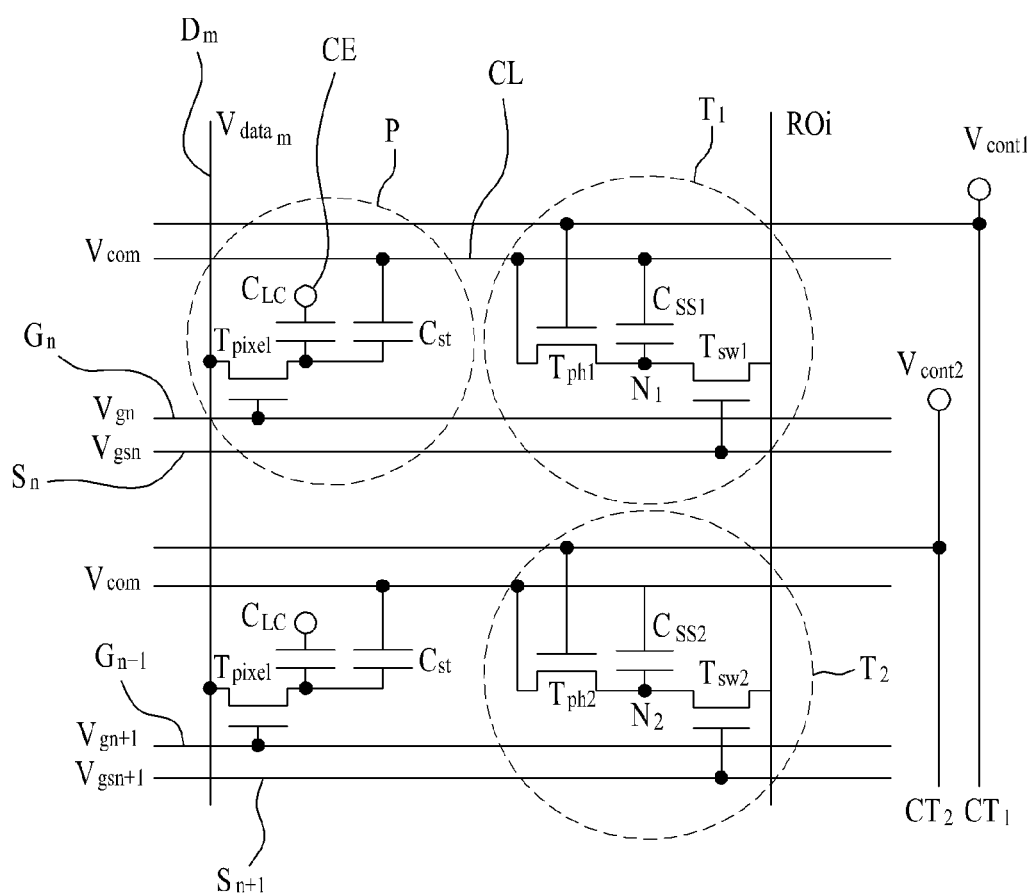
FIG. 6 is a circuit view illustrating an equivalent circuit of a photo-sensing type touch panel embedded liquid crystal display device according to a first embodiment of the present invention.
Figure 7:
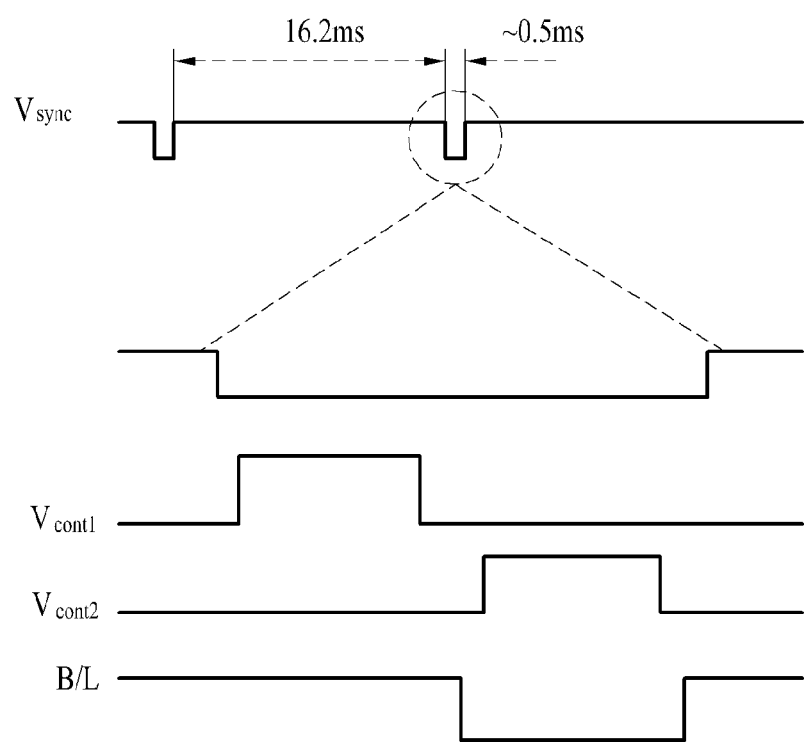
FIG. 7 is a diagram illustrating a drive-timing of FIG. 6.

FIG. 6 is a circuit view illustrating an equivalent circuit of a photo-sensing type touch panel embedded LCD device according to a first embodiment of the present invention and FIG. 7 is a diagram illustrating a drive-timing of FIG. 7.

As shown in FIGS. 6 and 7, the photo-sensing type touch panel embedded LCD device according to this embodiment of the present invention includes a pixel circuit P formed in a cross portion between the nth gate line Gn and the mth data line Dm; a first touch sensor T1 formed in a cross portion among a first control line CT1, the nth switching line Vgsn and the ith readout line ROi; and a second touch sensor T2 formed in a cross portion among a second control line CT2, the n+1th switching line Vgsn+1 and the ith readout line Roi.

Here, the first touch sensor T1 and the second touch sensor T2 are adjacent to each other in a pair. The first touch sensor T1 and the second touch sensor T2 may be alternatively positioned in each pixel or they may be arranged in each area corresponding to one touched area in a pair. At this time, the pixel circuit P may be positioned in every pixel.

The pixel circuit P includes a pixel transistor Tpixel formed at a cross area among a liquid crystal cell C1c, a gate line Gn and a data line Dm for driving the liquid crystal cell C1c and a storage capacitor Cst for maintaining a charge voltage of the liquid crystal cell Clc for a single frame. Here, the storage capacitor Cst has a one end connected to a drain electrode of the pixel transistor Tpixel and the other end connected to a common line CL. The liquid crystal cell C1c has a one end connected to the drain electrode of the pixel Tpixel and the other end connected to a common electrode CE.

The first touch sensor T1 includes a first sensor transistor Tph1, a first sensor capacitor Css1 and a first switching transistor Tsw1. After an enable signal Vgsn is applied to the nth switching line Sn, the first sensor transistor Tph1 generates a photo electric current while a first control signal Vcon1 from the first control line CT1 is maintained to a high phase, and not generating a photoelectric current while the first control signal Vcon1 is maintained to a low phase. The first sensor capacitor Css1 stores electric charges generated by the photoelectric current. The first switching transistor Tsw1 switches the electric charges stored in the first sensor capacitor Css1 to a readout line ROi.

Similar to the first touch sensor T1, the second touch sensor T2 includes a second sensor transistor Tph2, a second sensor capacitor Css2 and a second switching transistor Tsw2 with an identical configuration.

Here, gate electrodes of the first and second sensor transistors Tph1 and Tph2 are connected to the first and second control lines CT1 and CT2, respectively, and source electrodes thereof are connected to a common line CL and drain electrodes thereof are connected to first and second nodes N1 and N2, respectively.

The first sensor capacitor Css1 is positioned between the common line CL and the first node N1 and the second sensor capacitor Css2 is positioned between the common line CL and the second node N2.

A gate electrode of the first switching transistor Tsw1 is connected to the nth switching line Sn and a source electrode thereof is connected to the first node N1 and a drain electrode thereof is connected to the ith readout line ROi. A gate electrode of the second transistor Tsw2 is connected to the n+1th switching line Sn+1 and a source electrode thereof is connected to the second node N2 and a drain electrode thereof is connected to the ith read out line ROi.

The first and second control signals Vcont1 and Vcont2 are applied to the first and second control lines CT1 and CT2 for every falling time of a vertical synchronization signal Vsync. The falling time is generated every period as shown in FIG. 7. The backlight is put into operation in an initial state before the vertical synchronization signal Vsync is fallen.

If sequentially described, the first control signal Vcont1 is turned on after the vertical synchronization signal Vsync falls, and next the first control signal is turned off in a predetermined time period. Then, the backlight is turned off and the second control signal Vcont2 is turned on. After the second control signal Vcont2 is turned off, the backlight is converted to an on-operation state.

According to this embodiment, when such the first control signal Vcont1 is applied to the first control line CT1, the electric charge stored in the first sensor capacitor Css1 of the first touch sensor T1 is transmitted via the first switching transistor Tsw1 and output to the readout line ROi, with a predetermined voltage. When the second control signal Vcont2 is applied to the second control line CT2, the electric charge stored in the second sensor capacitor Css2 of the second touch sensor T2 is transmitted via the second switching transistor Tsw2 and output to the readout line ROi, with a predetermined voltage.

Here, the voltage output to the readout line from the second touch sensor T2 is subtracted from the voltage output to the readout line from the first touch sensor T1 to detect a touch point.

Operation of such the touch point sensing will be described.

During an initial period, a reference voltage Vref (which may be predetermined) of the readout line ROi is maintained in first and second sensor capacitors Css1 and Css2. The first and second control signals Vcont1 and Vcont2 are applied to the first and second control lines CT1 and CT2, respectively during a vertical blank period as shown in FIG. 7.

In case the first control signal Vcont1 is applied to the first control line CT1, leak current of the first sensor transistor Tph1 increases and this leak current is stored in the first sensor capacitor Css1. In case the second control signal Vcont2 is applied to the second control line CT2, the backlight is turned off and leak current of the second sensor transistor Tph2 is stored in the second sensor capacitor Css2. The stored voltage is readout by the corresponding readout line ROi according to the driving of the first and second switching transistors Tsw1 and Tsw2 into a first and second voltage V1 and V2. In case of no-touch, the first and second voltages output to the readout line ROi via the first and second touch sensors T1 and T2 have identical values because of the identical external light. In case of touch, the first voltage V1-backlight turned on includes a voltage generated by the backlight reflection light and the first voltage V2-backlight turned off includes a reference voltage. As a result, voltage difference increases. Especially, in case the amount of the external light is identical to or smaller than the amount of the reflected light at the time when the panel is touched, the light amount difference in the vertical blank period when the backlight is turned on and is turned off are calculated to sense touch based on a corresponding calculated value. As a result, it is possible to sense touch stably, regardless of external light intensity.

At this time, the first and second control signals Vcont1 and Vcont2 are maintained off in the initial state. When the backlight is on, the first control signal Vcont1 is turned on and off to be stored in the first sensor capacitor Css1 of the first touch sensor T1. After the backlight is turned off, the second control signal Vcont2 is on and off to be stored in the second sensor capacitor Css2 of the second touch sensor T2. The signal stored in the first and second sensor capacitors Css1 and Css2 of the first and second touch sensors T1 and T2 may be output to the readout line according to the switching signal applied to the switching lines.

Figure 8:
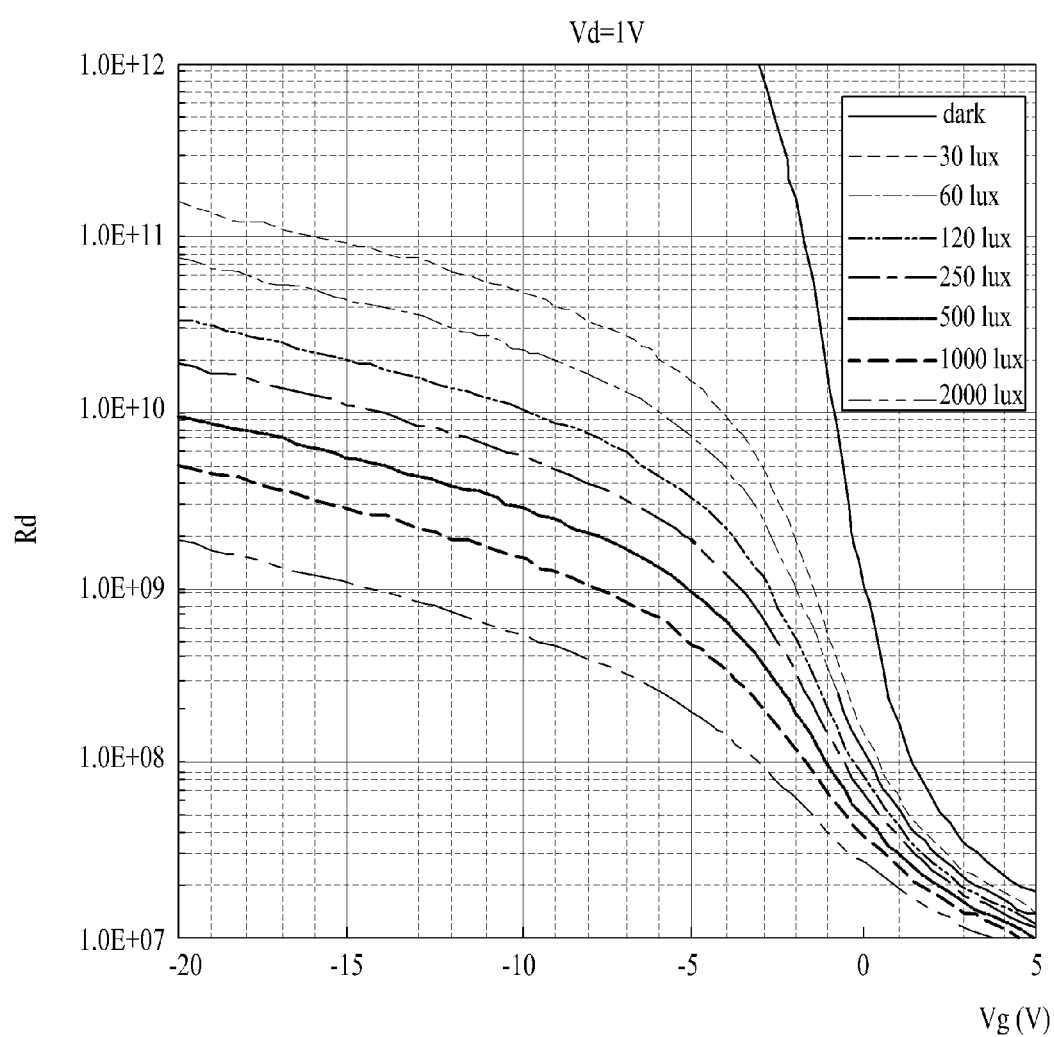
FIG. 8 is a graph illustrating resistance of a photo-sensing transistor according to a gate voltage.

FIG. 8 is a graph illustrating resistance of the photo-sensor transistor according to a gate voltage.

As shown in FIG. 8, according to the resistance of the photo-sensor transistor based on the gate voltage, if the gate voltage is below a control voltage Vg, resistance decreases. If the gate voltage is beyond the control voltage Vg, resistance increases to maintain a sampling voltage for a predetermined time period. That is, if a voltage applied by the control signal is maintained below a predetermined value, the voltage saturated by the readout line ROi will be output. As a result, touch may be sensed by predetermined much voltage difference between when the backlight is on and off.

Figure 9:
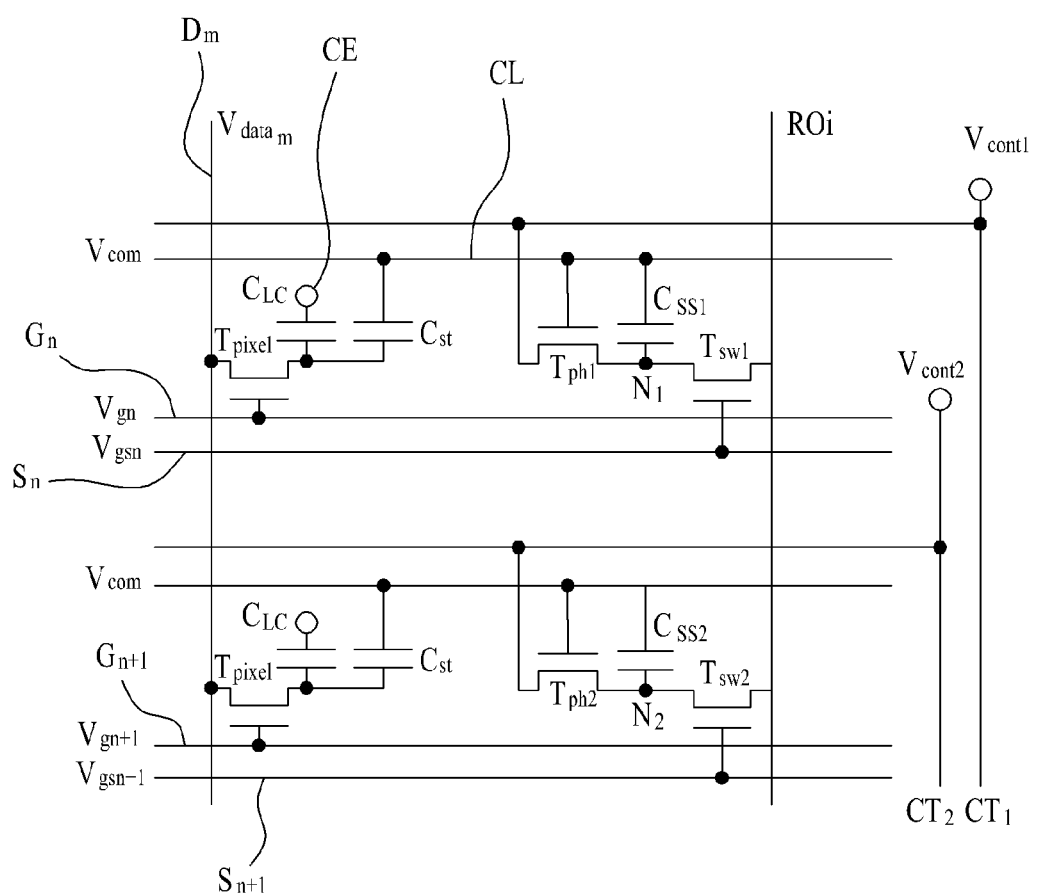
FIG. 9 is a circuit view illustrating an equivalent circuit of a photo-sensing type touch panel embedded liquid crystal display device according to a second embodiment of the present invention.
Figure 10:
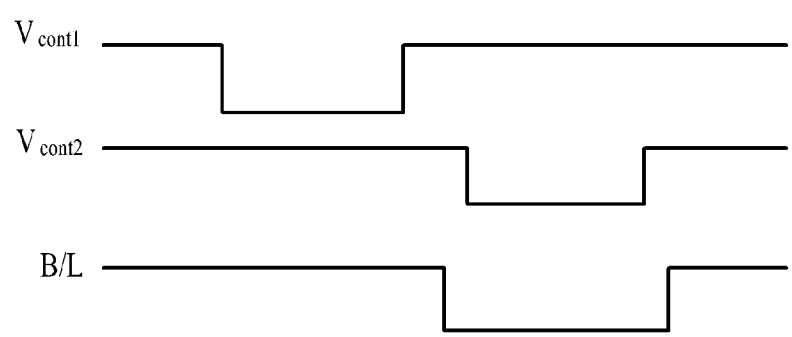
FIG. 10 is a diagram illustrating a drive-timing of FIG. 9.

FIG. 9 is a circuit view illustrating an equivalent circuit of a photo-sensing type touch panel embedded LCD device according to another embodiment of the present invention and FIG. 10 is a diagram illustrating a drive-timing of FIG. 9.

FIGS. 9 and 10 show the photo-sensing type touch panel embedded LCD device according to a second embodiment of the present invention. In comparison to the first embodiment, this second embodiment shows that the gate electrodes and source electrodes of the first and second sensor transistors Tph1 and Tph2 are connected vice versa. That is, the gate electrodes of the first and second sensor transistors Tph1 and Tph2 are connected to the common line CL, respectively. In this state, the source electrodes thereof are connected to the first and second control lines CT1 and CT2, respectively. According to this embodiment, voltage having an opposite phase in comparison to the first and second control signals Vcont1 and Vcont2 of the above first embodiment is applied to the first and second control lines CT1 and CT2 and the identical value is gained. As described sequentially, the first and second control signals Vcont1 and Vcont2 maintains values in the initial state before the falling of the synchronization signal Vsync, that is, the vertical blank period. After the falling of the synchronization signal Vsync. Next, the first control signal Vcont1 is turned off and the first control signal Vcont1 is turned back to on in a predetermined time period. After that, the backlight is turned off and the second control signal Vcont2 is turned off. Then, the second control signal Vcont2 is turned on and then the backlight is turned back to on.

Here, in case of no-touch, the voltage output to the readout line ROi via the first and second touch sensors T1 and T2 has identical first and second voltage values because of the identical external line. In case of touch, the first voltage V1-the backlight on includes a voltage generated by the backlight reflection light and the second voltage V2-the backlight off includes a voltage similar to the reference voltage Vref such that difference between the two voltages may increase.

Figure 11:
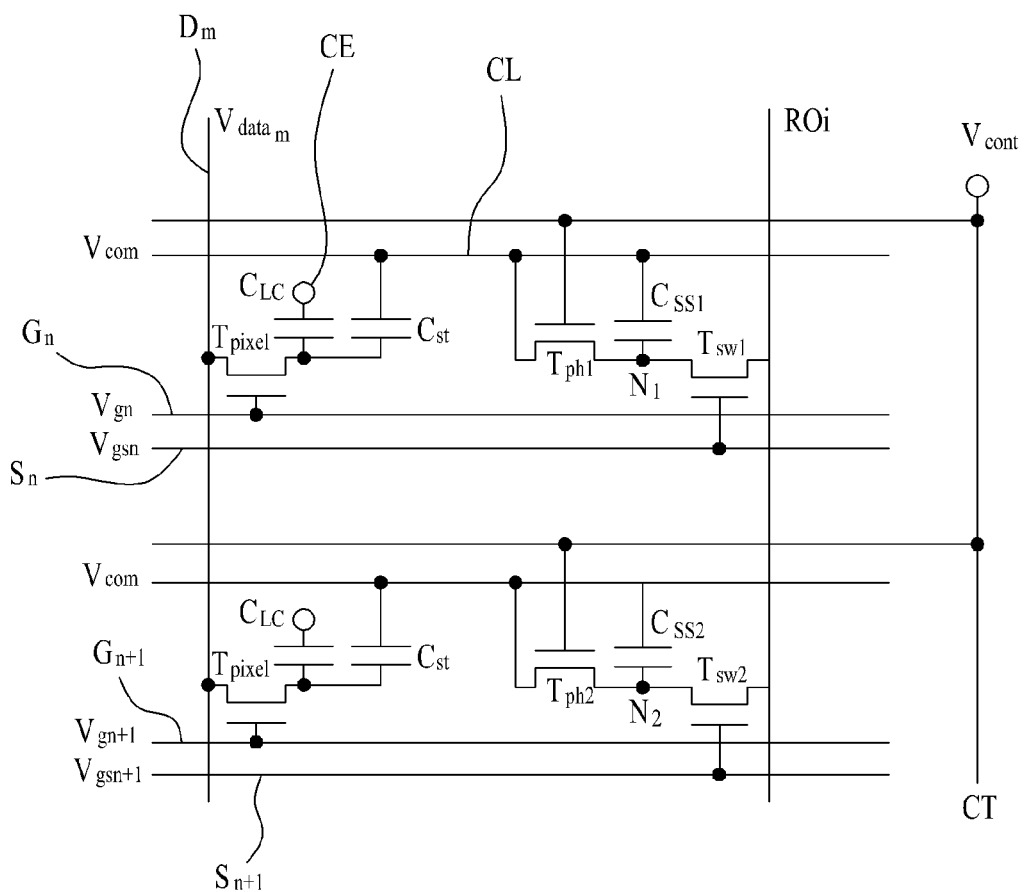
FIG. 11 is a circuit view illustrating an equivalent circuit of a photo-sensing type touch panel embedded liquid crystal display device according to a third embodiment of the present invention.
Figure 12:
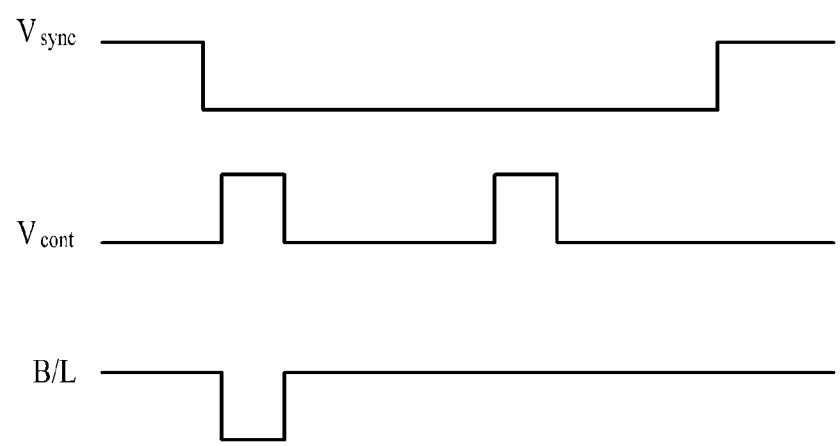
FIG. 12 is a diagram illustrating a drive-timing of FIG. 11.

FIG. 11 is a circuit view illustrating an equivalent circuit of a photo-sensing type touch panel embedded LCD device according to a third embodiment of the present invention and FIG. 12 is a diagram illustrating a drive-timing of the circuit shown in FIG. 11.

As shown in FIGS. 11 and 12, the photo-sensing type touch panel embedded LCD device according to the third embodiment of the present invention includes a single control line CT, compared to the first and second control lines of the first embodiment. In this case, an off signal may be applied two times to the single control line in the vertical blank period.

As described sequentially, the control signal Vcont is maintained off in the initial state before the falling of the vertical synchronization signal Vsync and the control signal Vcont is turned on after the falling of the vertical synchronization signal Vsync. Then, the backlight is turned off, and then the control signal is turned off in a predetermined time period. Then, the control signal is turned on again for a second time. That is, according to this third embodiment, the control signal Vcont is driven on two times in a single vertical synchronization signal. When the control signal is in an on-state each time, the voltage value output to the first and second touch sensors T1 and T2 is sensed by the readout line to detect touch based on a calculated value.

In case of no-touch, the voltage value output to the readout line ROi via the first and second touch sensors T1 and T2 has identical first and second voltages because of the identical external light. In case of touch, the first voltage V1-the backlight on includes a voltage generated by the backlight refection light and the second voltage V2-the backlight off includes a voltage similar to the reference voltage. As a result, difference between the two voltages increases.

In embodiments of the invention, a control signal is applied in non-overlapping periods. As shown in FIGS. 7, 10, and 12, the same on states, or the same off states of respective control signals are non-overlapping. Also, it is preferable, but not required, that the control signal is applied either prior to, or after, the backlight is turned off. As shown in FIGS. 7 and 10, the second control signal Vcont2 is applied after the backlight B/L is turned off. Nevertheless, as shown in FIG. 12, such is not required.

Figure 13A:
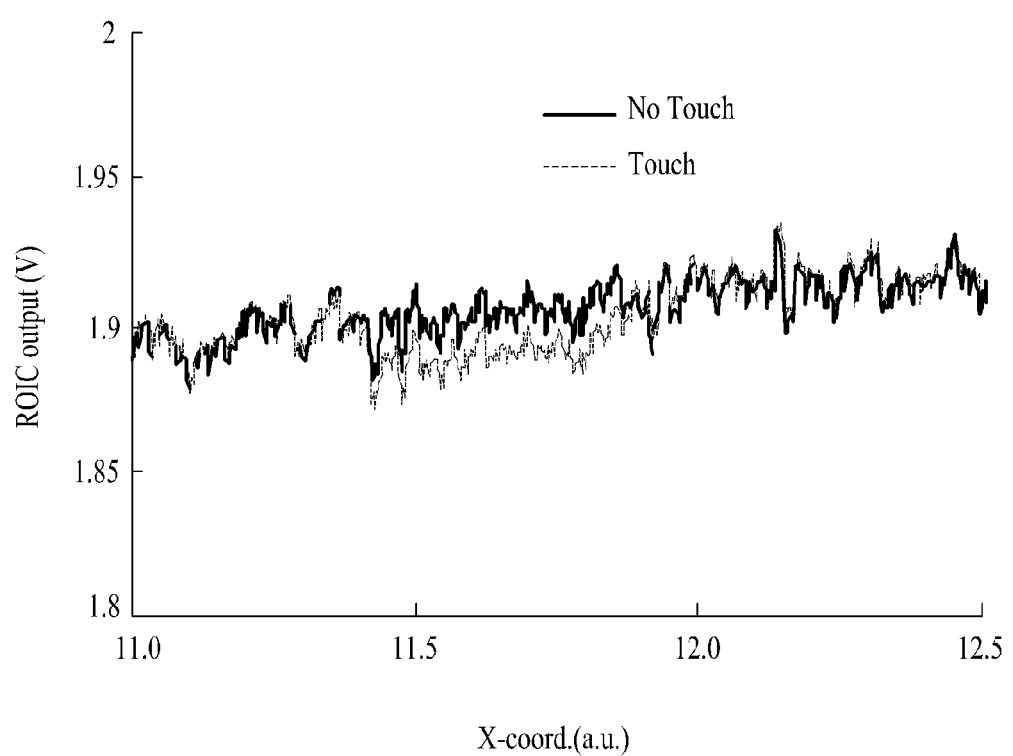
FIGS. 13A and 13B are graphs illustrating a voltage readout from a readout line in case of touch and non-touch, if a backlight unit is not switched, and voltage difference.
Figure 13B:
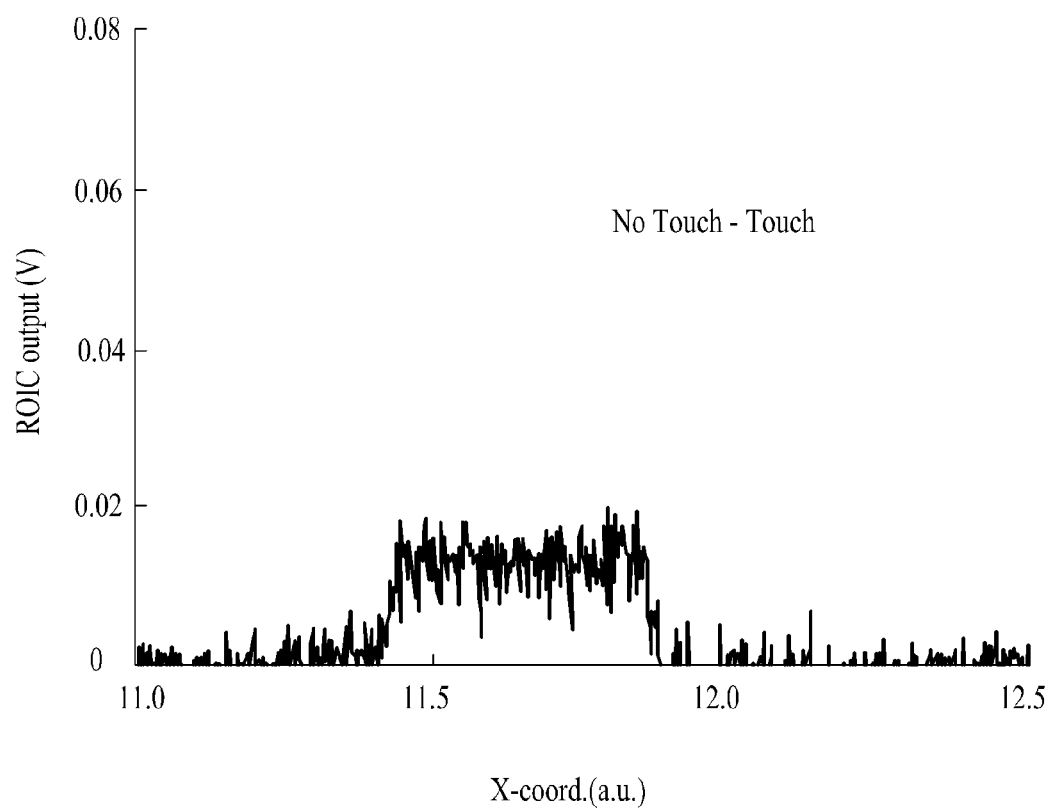

FIGS. 13A and 13B are graphs illustrating a voltage value readout by the readout line in case of touch and no-touch, with no-swing of the backlight unit, and difference of the voltage.

FIGS. 13A and 13B show a voltage value readout by the readout line in case of the touch and no-touch, with the backlight unit in on state continuously. As shown in FIG. 13A, there is a little voltage difference between when a touch is generated at a predetermined point of X coordinate and when a touch is not generated at the touch point.

Specifically, as shown in FIG. 13B, a readout value of the readout voltage in case of the touch is subtracted from a readout value of the readout voltage in case of the no-touch. If then, voltage difference below 0.02V occurs only in the touch point corresponding to approximately 11.5~12.0 a.u. If the voltage value is relatively low, it is difficult to sense the touch and the touch happens to be mal-sensed by an area covered by the user's palm, not actual touch of the user's finger. In this case, the touch sensing may be performed by the light amount difference between the external light and the reflected light of the touch point.

Figure 14A:
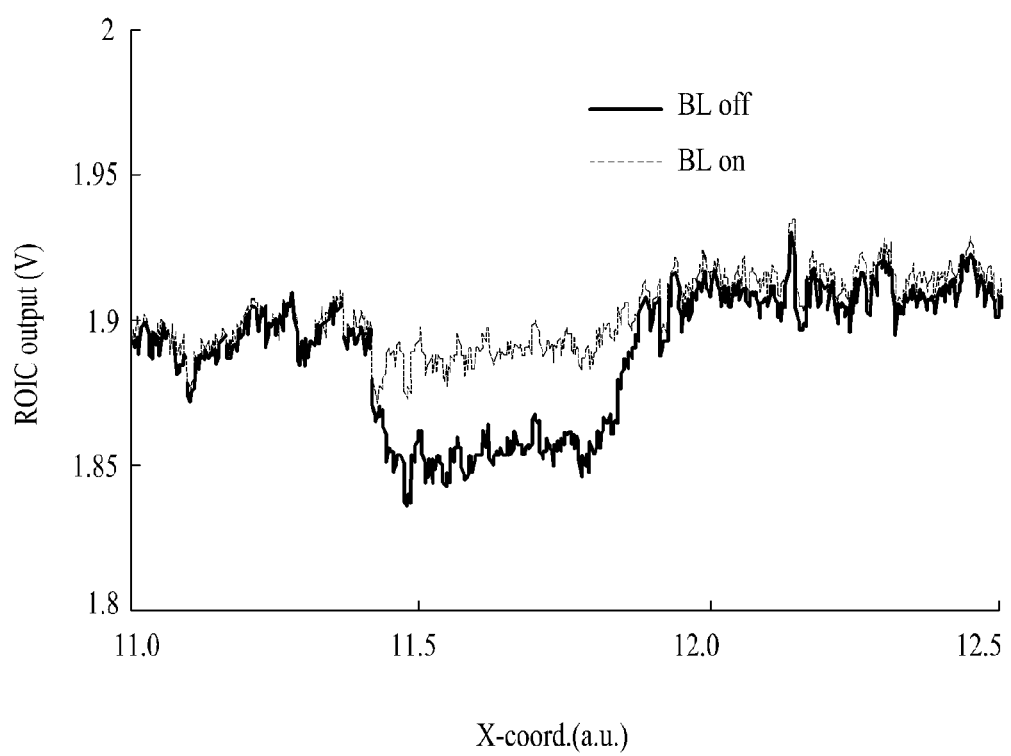
FIGS. 14A and 14B are graphs illustrating a voltage readout from a readout line, in case of touch and non-touch generated when a backlight unit of the photo-sensing type touch panel embedded liquid crystal display device is turned on and off.
Figure 14B:
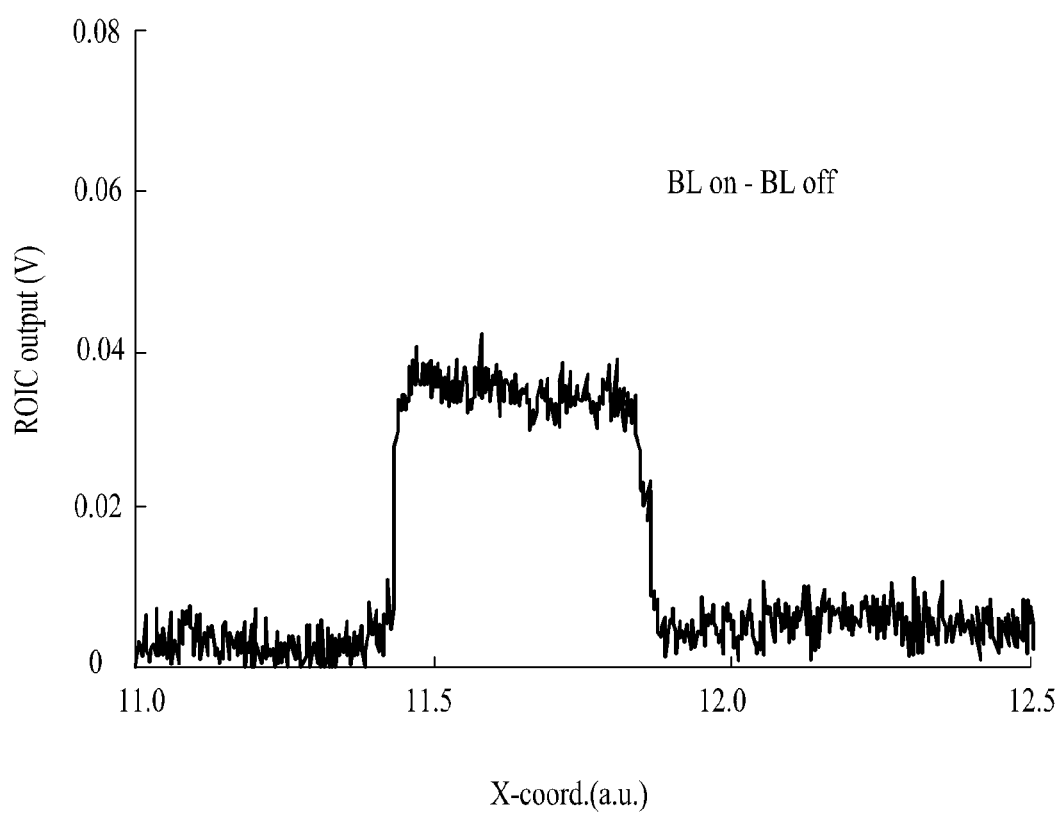

FIGS. 14A and 14B are graphs illustrating a voltage value readout by the readout line in case of touch and non-touch that is generated by the turning-on/off of the backlight unit and voltage value difference.

FIGS. 14A and 14B are graphs corresponding when the swing of the backlight is applied. As shown in FIG. 14A, non-touch areas are influenced by the external light uniformly and they have identical voltage values of readout voltage when the backlight is turned on and off. The readout voltage difference when the backlight is turned on and off is generated only in the touch point.

If the subtraction of the voltage value output from the readout line when the backlight is on and off is applied as shown in FIG. 14A, touch is generated in an area between 11.5~12.0 a.u. with respect to X coordinate and the present invention applies the on/off of the backlight unit thereto to detect the touch point based on the subtraction. As a result, the touch may be detected based on whether the reflection light is applied to the touch point, regardless of the influence of the external light and the touch detection may be enabled by approximately 0.04V of the difference between the readout value and the reference voltage value when the reflection light is applied.

Figure 15:
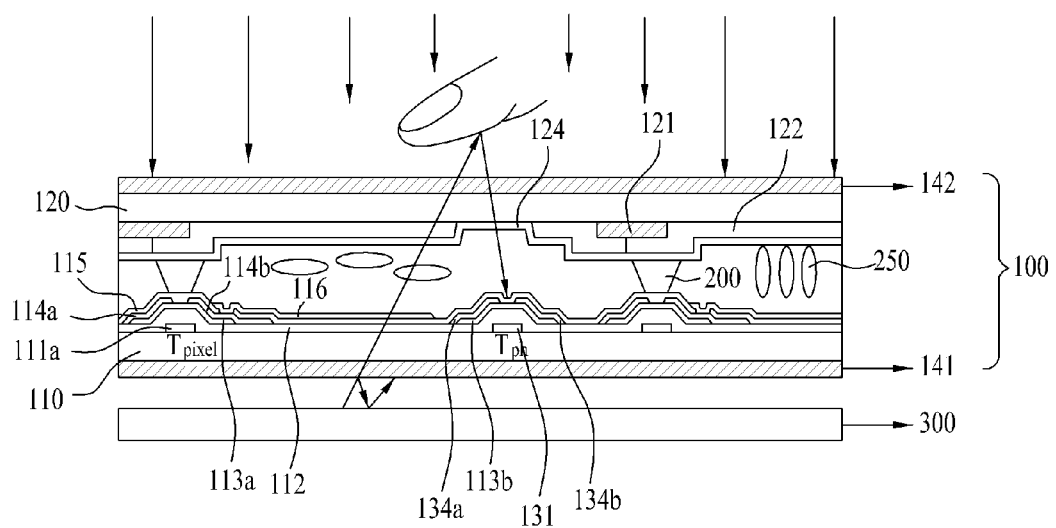
FIG. 15 is a sectional view illustrating the photo-sensing type touch panel embedded liquid crystal display device according to the present invention.

FIG. 15 is a sectional view illustrating the photo-sensing type touch panel embedded LCD device according to the present invention.

As shown in FIG. 15, the photo-sensing type touch panel embedded LCD includes the liquid crystal panel 100 and the backlight unit 300 formed on a backside of the liquid crystal panel 100.

Here, the liquid crystal panel 100 includes first and second substrates 110 and 120 facing each other, gate and data lines VGsn and Vdatam, as shown in FIG. 6, crossedly aligned on the first substrate 110 to define pixel regions, a pixel circuit P, as shown in FIG. 6, formed in each of the pixel regions and a touch sensor T1 and T2, as shown in FIG. 6. FIG. 15 shows a single touch sensor for convenience sake.

Here, in the pixel circuit P, Tpixel includes a gate electrode 111a, a gate insulation layer 112 covering the gate electrode 111a, a semi-conductor layer pattern 113a provided on the gate insulation layer 112, source and drain electrodes 114a and 114b provided in both opposite sides of the semi-conductor layer pattern 113a, a protection layer 115 covering the source/drain electrodes 114a and 114b, exposing a predetermined area of the drain electrode 114b, and a pixel electrode 116 in contact with the exposed drain electrode 114b.

The touch sensor Tph includes a gate electrode 131, a gate insulation layer 112 covering the gate electrode 131, a semi-conductor layer 113b provided on the gate insulation layer 112, and source and drain electrodes 134a and 134b provided in both opposite sides of the semi-conductor layer pattern 113b.

The second substrate 120 includes a black matrix layer 121 covering a non-pixel region, that is, a region having the gate and data lines aligned therein, a color filter layer 122 covering the black matrix layer 121, corresponding to the pixel regions, and a common electrode formed in a front surface of the second substrate 120 including the color filter layer 122.

Here, the black matrix layer 121 and the color filter layer 122 opens an area of the sensor transistor Tph corresponding to the touch sensor. This is because it is preferable to prevent a light passage from increasing when the user's finger or the like reflects the light emitted from the backlight in the photo-sensing structure for detecting touch based on the light reflected by the user's finger or the like from the light emitted from the backlight unit.

Not shown in the drawings, alignment layers may be formed on top surfaces of the first and second substrates 110 and 120, respectively.

A liquid crystal layer is filled between the first and second substrates 110 and 120 and a spacer 200 is formed there between to maintain a predetermined gap between the first and second substrates 110 and 120.

First and second planarization plates 141 and 142 are formed on backsides of the first and second substrates 110 and 120, respectively.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch sensor embedded liquid crystal display device including a backlight unit which emits backlight when turned on and does not emit the backlight when turned off, the liquid crystal display device comprising:
a liquid crystal panel comprising at least one touch sensor provided in each of n pixels, where n is a Natural Number;
an ROIC readout part which receives a readout voltage value from readout lines provided in the liquid crystal panel;
an ADC conversion part which converts an analog voltage value transmitted to the ROIC readout part into a digital value;
a calculation part which calculates a calculated value by subtracting a corresponding value detected from the ADC conversion part when the backlight is not applied from a value detected from the ADC conversion part when the backlight is applied; and
a position detection part for detecting a touch point on the liquid crystal panel if the calculated value from the calculation part is beyond a predetermined value,
wherein the liquid crystal panel further comprises:
at least one pixel circuit for each of the n pixels;
a pair of sensors corresponding to the at least one pixel circuit, each of the pair of sensors comprising a first sensor detecting an amount of first light while the backlight unit is turned on to output a first voltage corresponding to the detected amount of the first light and a second sensor detecting an amount of second light while the backlight unit is turned off to output a second voltage corresponding to the detected amount of the second light, wherein a difference of the first voltage and the second voltage is the calculated value in the calculation part; and a first control line and a second control line, and at least one of the readout lines connected to the pair of sensors, wherein each of the first and second sensors comprises, a sensor transistor driven by a first control signal or a second control signal of the first and second control lines to sense light;

a sensor capacitor for storing a signal corresponding to the light sensed by the sensor transistor; and a switching transistor connected to the sensor capacitor, to transmit the signal stored in the sensor capacitor to the at least one of readout lines when switched, wherein the first control signal is applied to the first sensor via the first control line during the backlight unit is turned on and the second control signal is applied to the second sensor during the backlight unit is turned off, and the first and second control signals are applied within a vertical blank period of a vertical synchronization signal of the liquid crystal panel.

2. A liquid crystal display device, comprising:

at least one pixel circuit;

a backlight unit which emits back light when turned on and does not emit the back light when turned off;

a pair of sensors corresponding to the at least one pixel circuit, each of the pair of sensors comprising a first sensor detecting an amount of first light while the backlight unit is turned on to output a first voltage corresponding to the detected amount of the first light, and a second sensor detecting an amount of second light while the backlight unit is turned off to output a second voltage corresponding to the detected amount of the second light; and a first control line and a second control line, and at least one of the readout lines connected to the pair of sensors, wherein each of the first and second sensors comprises, a sensor transistor driven by the first control signal or the second control signal to sense light;

a sensor capacitor for storing a signal corresponding to the light sensed by the sensor transistor; and a switching transistor connected to the sensor capacitor, to output the signal stored in the sensor capacitor, wherein the first control signal is applied to the first sensor via the first control line during the backlight unit is turned on and the second control signal is applied to the second sensor via the second control line during the backlight unit is turned off, and wherein the first and second control signals are applied within a vertical blank period of a vertical synchronization signal of the liquid crystal panel.

3. The liquid crystal display device of claim 2, wherein, when the liquid crystal display device is touched, the detected amount of the first light and the detected amount of the second light are different.

4. The liquid crystal display device of claim 2, wherein, when the liquid crystal display device is not touched, the detected amount of the first light and the detected amount of the second light are about the same.

5. A method of driving a liquid crystal display device having at least one pixel circuit, first and second sensors corresponding to the at least one pixel circuit, and a backlight unit which emits backlight when turned on and does not emit the backlight when turned off, the method comprising:

providing a vertical synchronization signal having a predetermined fallen time period to the liquid crystal display device;

applying first and second control signals to first and second control lines of respective first and second sensors during the predetermined fallen time period;

outputting the respective signals stored in respective sensor capacitors of the first and second sensors through a readout line; and calculating a difference between the respective signals from first and second sensors to determine whether the at least one pixel circuit has been touched, wherein the first control signal is applied to the first sensor for a predetermined fallen period via the first control line while the backlight unit is on, and the second control signal is applied to the second sensor subsequent to the predetermined fallen time period via the second control line while the backlight unit is off, and wherein the first and second control signals are applied within a vertical blank period of a vertical synchronization signal of the liquid crystal panel.

* * * * *